United States Patent [19]  
Kennedy

[11] Patent Number: 4,848,081  
[45] Date of Patent: Jul. 18, 1989

[54] COOLING MEANS FOR AUGMENTOR LINER

[75] Inventor: Christopher A. Kennedy, Palm Beach Gardens, Fla.

[73] Assignee: United Technologies Corporation, Hartford, Conn.

[21] Appl. No.: 200,481

[22] Filed: May 31, 1988

[51] Int. Cl.$^4$ .............................................. F02K 3/10
[52] U.S. Cl. ........................................ 60/261; 60/757
[58] Field of Search ................ 60/261, 757, 755, 756, 60/264, 265, 262; 431/352, 351

[56] References Cited

U.S. PATENT DOCUMENTS

| | | | |
|---|---|---|---|
| 2,709,337 | 5/1955 | Markowski | 60/261 |
| 2,840,989 | 7/1958 | Macaulay | 60/756 |
| 2,874,536 | 2/1959 | Benson et al. | 60/261 |
| 2,974,486 | 3/1961 | Edwards | 60/261 |
| 3,137,998 | 6/1964 | Beam, Jr. | 60/265 |
| 3,420,058 | 1/1969 | Howald et al. | 60/757 |
| 3,485,043 | 12/1969 | Ehrich | 60/757 |
| 3,712,062 | 1/1973 | Nash | 60/261 |
| 4,242,871 | 1/1981 | Breton | 60/757 |
| 4,529,358 | 7/1985 | Papell | 416/97 A |
| 4,688,310 | 8/1987 | Kelm et al. | 60/757 |
| 4,718,230 | 1/1988 | Honeycutt, Jr. et al. | 60/261 |

FOREIGN PATENT DOCUMENTS 2169696  7/1986  United Kingdom ................. 60/261

OTHER PUBLICATIONS

"Turbulent Flow Over Large-Amplitude Wavy Surfaces", by J. Buckles, T. J. Hanratty, R. J. Adrian; J. Fluid Mech. (1984), vol. 140, pp. 27-44 (GB).

Primary Examiner—Donald E. Stout  
Attorney, Agent, or Firm—Norman Friedland

[57] ABSTRACT

An augmentor liner cooling holes are judiciously shaped and discretely located so as to optimize film cooling of the liner. The "kidney" shaped holes are circumferentially spaced on the upstream end of each of the corrugations and are preferably paired in two adjacent rows in a staggered configuration so as to lay a generally uniform circumferential layer of film cooling air internally of the liner.

6 Claims, 2 Drawing Sheets 4,848,081

COOLING MEANS FOR AUGMENTOR LINER

This invention was made under a Government contract and the Government has rights therein.

DESCRIPTION

1 Technical Field

This invention relates to liners for gas turbine engine augmentors and particularly to the cooling thereof.

2. Background Art

As is well known, augmentor liners are fabricated from sheet metal and are formed in a corrugated or sinusoidally-shaped cylinder or conelike element so as to fall within structural and weight constraints. The liner is supported but spaced to the augmentor's cylindrically-shaped casing and defines an annular passageway therewith that conducts a portion of cooling air typically supplied from the compressor to openings formed in the liner and a portion that is ultimately discharged at the engine's exhaust nozzle. Since the advent of high performance aircraft, it is of paramount importance that only that amount of air necessary for cooling the various engine parts is utilized as the use of all of this air results in a penalty to the engine's performance, although some of the air that is returned to the gas path does re-enter the combustion process so that this cooling air does not debit engine performance as much as the air that isn't returned to the gas path.

In addition to the cooling requirement, some perforations in the liner serve to reduce or prevent screeching, extremely high sound pressure levels created by the adjacent combustion. In the cooling process a portion of the air is used to cool the exhaust nozzle and the remaining portion is used to cool the liner itself. From practical consideration the porosity of the liner is preselected to achieve the proper liner cooling and screech dampening effects and the amount of air that is available for these purposes is predetermined. Hence, the designer of the liner must design the liner staying within these operating constraints.

Therefore, the objective that a designer has is to maintain the cooling and screech dampening requirements during the engine's operating mission without incurring any more penalty than is necessary.

Because the sheet metal is relatively thin and is sinusoidally shaped, difficulty has been encountered because the jets of cooling air flowing through holes in the liner tend to penetrate into the gas path rather than lie flat over the surface of the liner. Ideally, the designer attempts to impose a film of cool air adjacent the liner surface and maintain the film uniformly around the liner in a circumferential and an axial direction. Less than ideal cooling results if the cooling air is allowed to directly penetrate into the gas path.

One such attempt to attain a film of cooling air was made by bending the holes in the liner to orient its center line so that it would direct the air in an axial direction parallel to the surface of the liner such that the air discharging from the hole would tend to lay a film against the surface of the liner. In that instance, each radial hole would mechanically be oriented by locating a tool in the hole and then rotating the tool so as to distort the surface around the hole. While this method has met with some success, the working of the holes in the liner is cumbersome and expensive.

U.S. Pat. No. 4,529,358 granted to S. S. Papell on July 16, 1985 discloses a cusp-shaped hole formed in a wall for defining a passageway which is intended to cause the air passing therethrough to form a film. The wall is sufficiently thick so as to present sufficient coolant passage distance to define a 3-dimensional hole. For example, in the Papell patent, supra, the L/D (length/diameter) would approximate a value of 5.0, where L is the length of the hole passageway, D is effective diameter which is equal to $$\sqrt{\frac{4A}{\pi}},$$

and $\pi$ is 3.1416.

This is in contrast to a relatively thin sheet metal liner where the holes are punched or laser drilled in it. In this design the L/D approximates 0.31 for the screech hole and 0.17 for the cooling hole. Moreover, in the flat plate designs the flow adjacent to the flat surface is essentially a free parallel stream as contrasted to the sinusoidally-shaped liners that create "hills and valleys" that inherently create recirculation zones of the air flowing in the valley portion. Hence, the disclosure of U.S. Pat. No. 4,529,358, supra, which discloses a single cusp-shaped hole formed in a relatively thick wall, suggests that this shaped hole will produce a film of the air passing through the hole and penetrating a free stream. But this patent does not disclose how a cusp-shaped hole can be used to lay a film in a sinusoidally-shaped wall that hasn't sufficient dimension to form a 3-dimensional hole, and particularly where the penetration is into a recirculation zone.

I have found that I can improve on the cooling of the augmentor by using predefined shaped holes located at specific liner locations and in a discrete manner.

DISCLOSURE OF INVENTION

It is an object of this invention to provide an improved liner for a gas turbine engine's augmentor.

A further feature is to provide improved cooling means by utilizing pre-shaped holes disposed in specific locations in the liner and in a discrete array.

The foregoing and other features and advantages of the present invention will become more apparent from the following description and accompanying drawings.

BEST MODE FOR CARRYING OUT THE INVENTION

This invention is particularly efficacious in an application for an augmentor sheet metal liner for a gas turbine engine where the amount of cooling air and the porosity of the liner is predetermined. However, as one skilled in the art will appreciate, the concept disclosed herein may have utility in other applications.

As was described above, the designer of the liner must achieve the optimum cooling and screech absorption with specific design constraints. In the preferred embodiment the constraints that were considered were where the range of porosity of the liner would be between 1 to 4% and the non-dimensional parameter $2A/\lambda$ =between 0.1 and 0.2, where A is the amplitude of the sinusoidal wave. What is to be understood is that the particular location of the pre-shaped holes and the discrete spacing of these holes will be predicated on the particular application. The exact location will more likely than not be "tailored in" by actual testing of the liner. However, the description that follows will teach how this invention can be utilized given the conditions that have an affinity for this invention. For example, corrugations that are very shallow, say where the parameter $2A/\lambda$ is less than 0.0 5, the type of film cooling of this invention would not be appropriate.

Figure 1:
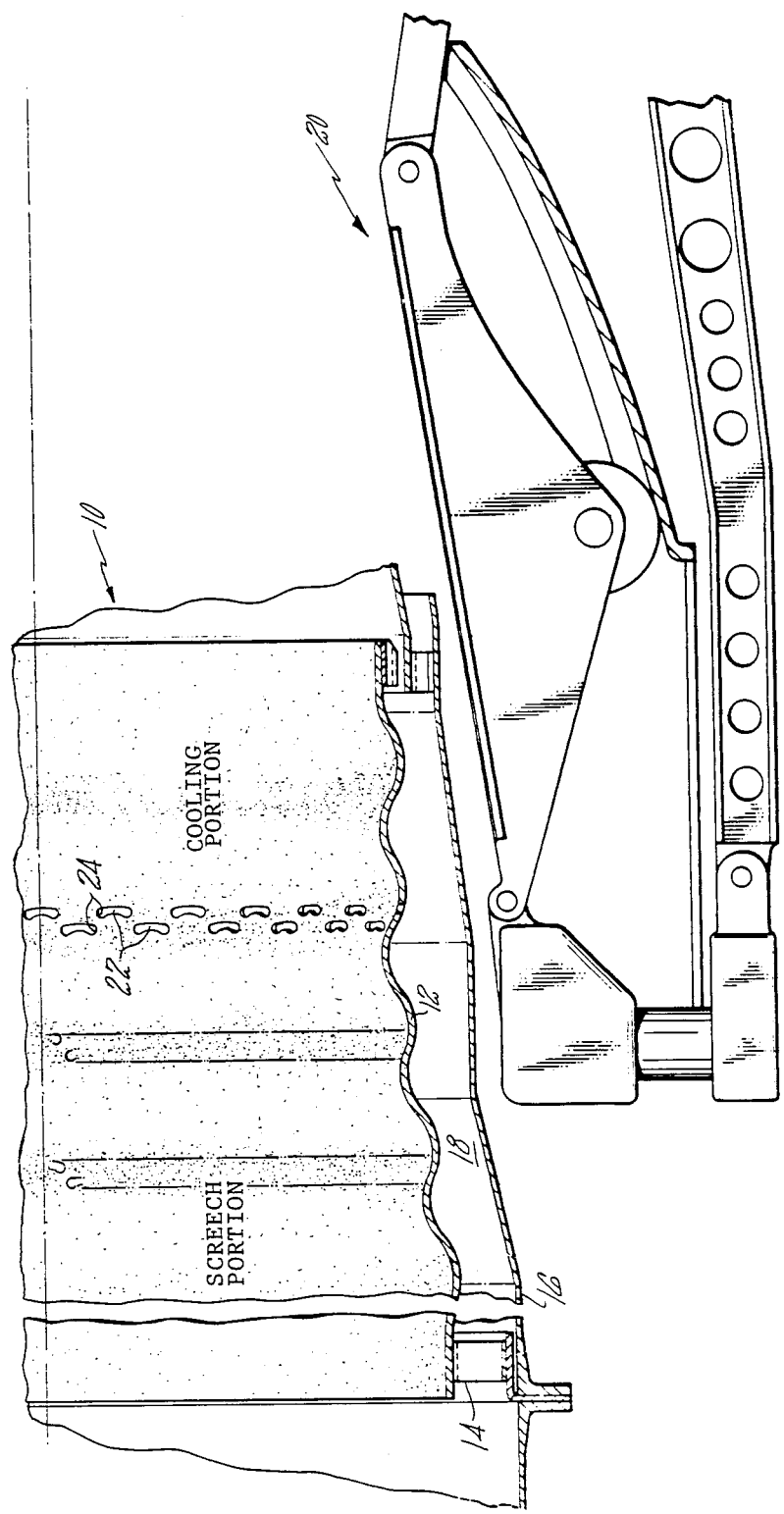
FIG. 1 is a partial view partly in section and partly in elevation showing the lines of an augmentor of a gas turbine engine.
Figure 2:
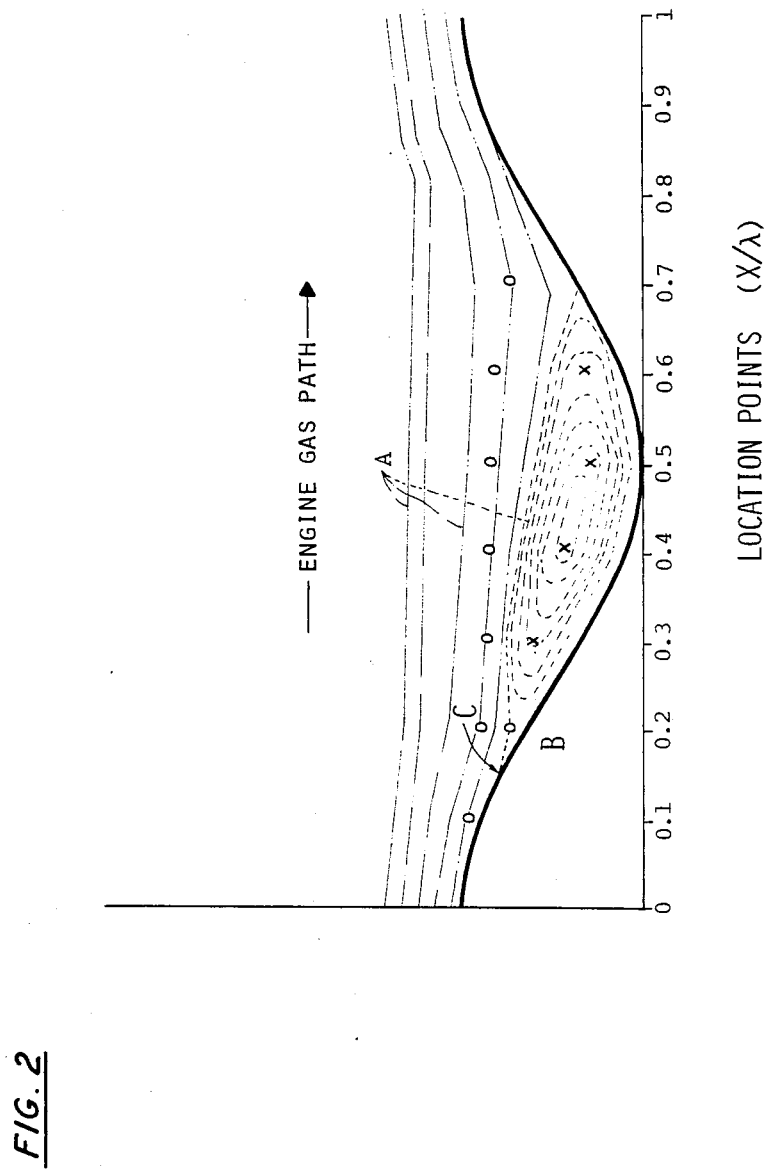
FIG. 2 is a graphical representation of one wave length ($\lambda$ Lambda) of the sinusoidally-shaped portion of the liner profiling the velocity of the gas path flowing adjacent thereto.

A better understanding of this invention can be had by referring to FIGS. 1 and 2. As noted in the drawings the augmentor generally illustrated by reference numeral 10 comprises a corrugated liner 12 suitably supported at one end by attachment means 14 to casing 16. The liner 12 and casing 16 define an annular passageway 18 for conducting the cooling air that serves to cool the liner which is exposed to the extremely high temperature of the gas path and the exhaust nozzle generally indicated by reference numeral 20.

As this is a typical arrangement of gas turbine augmentors, for the sake of convenience and simplicity the details thereof are omitted from the description. For further details of a typical liner, reference is made to the class of engines identified as the F-100 manufactured by the Pratt and Whitney division of United Technologies Corporation, the assignee of this patent application. Suffice it to say that a given percentage of the cooling air in annular passageway 18 flows through openings in the liner directly in the gas path and the remaining portion of the cooling air flows over the surface of the elements of the exhaust nozzle 20.

Ideally, the cooling air admitted into the gas path through the openings in the liner, as will be explained in further detail hereinbelow, should lay a film of cooling air on the inner surface of the liner to effectively shield the liner from the hot gases of the engine.

According to this invention and in the preferred embodiment an array of circumferentially spaced pre-shaped holes are judiciously located on the liner to effectively lay a film of cooling air on the inner surface of the liner. The holes 22 are elongated in the circumferential direction and are generally cusp-shaped. The bulbous ends 24 serve a dual purpose, namely for stress considerations and to minimize the detrimental effect of the free stream shearing caused by the cooling air discharging into the gas stream. Ideally, the cusp shape in this application produces no vortices by virtue of its shape While the bulbous end has a radius of curvature that does not present a stress concentration on the surface of the liner, the elongated shape of the hole (kidney shape) serves to introduce a flat sheet of air with no or minimal internal vertical movement. As is known, a circle has a constant radius of curvature and has the maximum value for that given area. However, when the area of the hole is redistributed from a circular to a non-circular shape, there obviously is a change in the radius of curvature. Hence, in this instance, the radius of curvature is selected so that the smallest radius of curvature is not significantly smaller than that of a circle of the same area. By making the ends 24 bulbous, the stress concentration factor was maintained within 1.8 times that of a circular hole of equal area. A higher stress concentration factor would have an adverse effect on the structural integrity of the liner.

Within the constraints of the porosity factor which obviously dictate the size and number of holes in a given location of the liner, according to this invention two rows of holes are closely spaced to each other, and the array of holes is selected so that there is a slight overlap of the ends of the adjacent holes in the circumferential direction. Hence the bulbous end 24 of the hole 22 in the upstream hole would extend circumferentially beyond the next adjacent bulbous end 24 of the adjacent axially-spaced hole 22. It is possible that the porosity and the manufacturing constraints may prohibit the overlapping, but wherever possible the flow of the air injected into the gas path in a given circumferential plane should be continuous around the circumference.

The rows of holes should be located on the upstream end relative to the flow of the gas path of the valley of the sine wave of the corrugation when viewed in the orientation depicted in FIG. 2. Reference should be made to this Figure which will best describe how the location of the holes are selected. FIG. 2 depicts the turbulent flow over the sinusoidal surface of a typical wave length of a corrugated liner where the parameter $2A/\lambda$ =0.200. The lines (A) represent the velocity profile of the flow adjacent the sine wave (B) of the corrugation of liner 12. As noted at point C, where flow separation occurs, the flow reverses and recirculation occurs. In tests, the locus of 50% instantaneous back-flow occurs as depicted by the "X" marks and 10% instantaneous backflow occurs by the "0" marks.

As is apparent from the foregoing, the holes are located in the sine wave at a location where the flow will penetrate in the recirculation zone. In the preferred embodiment where the parameter $2A/\lambda$=0.133 and the row spacing is $0.1\lambda$, rows should be located at a $X/\lambda$ location (location on the sine wave) that is within the range of 0.3 to 0.35 for the upstream row of holes and 0.4 to 0.45 in the downstream row of holes. It is recognized that due to manufacturing constraints, the spacing between rows may have to be extended to $0.2\lambda$ which would necessitate moving the upstream row to an $X/\lambda$ value of 0.15 and the downstream row to an $X/\lambda$ value of 0.35.

Where the corrugation steepness increases to values say where the parameter $2A/\lambda$ is greater than 0.200, it is more important to keep the row spacings as tight as possible. Under these circumstances the optimum placement for $0.1\lambda$ row spacings is located further downstream on the sine wave but not to exceed $X/\lambda$ location values of 0.55 to 0.60 for the upstream row and 0.65 and 0.70 for the downstream row.

While it is possible to analytically ascertain the location of the row of holes, it is nonetheless necessary to confirm these locations by heat discoloration test. The test would consist of operating the liner in its operating environment (temperature, velocities) and observe the discoloration of the thermal painted surface. An acceptable location for the row of holes would be on the downstream end of the sine wave directly upstream of the freestream reattachment point ($X/\lambda \approx .7$).

Thus, in the preferred embodiment, the hole spacings and row spacings as described and a porosity of 2% gives a $\eta$ (adiabatic film cooling effectiveness) value (area averaged) of approximately 0.30 for a Blowing parameter of 1.5. This compares to heretofore known designs that yield a $\eta$ equal to or less than 0.15. The cusp-shaped hole, oriented so that the bulbous portion 24 faces the upstream direction relative to the flow of the gas path and the judicious layout of these holes serve to locate and orient the jet of the injected cooling air in the puddle at the valley of the corrugation where it is distorted by the gases in the recirculation zone and freestream. By virtue of this arrangement, the jet unfolds into a flat sheet of cold air (no vortices) and lays down completely or as near completely as possible on the inner surface of the liner. Hot entrainment into this boundary layer is minimized owing to the absence of the vertical motion.

In this dual row configuration, the pitch-to-diameter ratio in any given row has been selected as a value that equals 2.0 which is near optimum, and as was mentioned above, the row spacings provide an essentially continuous slot being encountered by the freestream air of the gas path.

While the above description dealt primarily with the judicious arrangement for the pre-shaped holes in the cooling portion of the liner, the same principles apply for the screech portion of the liner. The major constraint in these two portions of the liner is the porosity. Typically, the porosity at the cooling portion is 1.59%, while the porosity at the screech portion is 3.44%. As will be apparent to those skilled in the art, the specifications for the augmentor liner construction will vary from application to application and the judicious location, the number of holes, the spacing of rows, pitch-to-diameter selection will likewise vary without departing from the principles embodied in this invention, and to this end utilizing these principles will provide a more optimum use of cooling air for an augmentor liner of a gas turbine engine.

Although this invention has been shown and described with respect to detailed embodiments thereof, it will be understood by those skilled in the art that various changes in form and detail thereof may be made without departing from the spirit and scope of the claimed invention.

I claim:

1. An augmentor for a gas turbine engine including a generally cylindrically-shaped corrugated sheet metal liner, a stream of cooling air surrounding said liner flowing axially from a most forward end to a rearward end relative to the direction of the engine's gas path, a plurality of cooling air holes in said liner, each of said cooling air holes being dimensioned in the shape of an elongated kidney, at least two adjacent rows of said cooling air holes being circumferentially spaced at the upstream end of at least one of said corrugations relative to the direction of said gas path, and each of said two adjacent rows being staggered so that each cooling air hole in one of said rows lies between two adjacent cooling air holes in said next adjacent row, so that a portion of said cooling air flows through said cooling air holes internally of said augmentor and defines a film of cooling air on the internal surface of said augmentor around the circumference of said liner.

2. An augmentor as claimed in claim 1, wherein each of said corrugations include said two adjacent rows of cooling air holes in the upstream end of each of said corrugations where cooling is intended.

3. An augmentor as claimed in claim 1 wherein said, said corrugation is sinusoidally shaped and the dimension of said sinusoidal shape is defined by a parameter, parameter approximates $2A/\lambda = 0.133$, the location of said two adjacent rows on said sinusoidal shape is calculated as a percentage of $\lambda$, said location being selected wherein the most upstream of said two adjacent rows is approximately $0.3$ to $0.35\lambda$ and the next adjacent row approximates $0.4$ to $0.45\lambda$, where A equals amplitude and $\lambda$ equals one wave length of the corrugations.

4. An augmentor as claimed in claim 1 wherein the parameter $2A/\lambda$ is greater than $0.05$.

5. An augmentor as in claim 1 wherein said kidney shaped hole has a concave surface facing the upstream end of said augmentor.

6. An augmentor as in claim 1 wherein said augmentor includes a section where screeching occurs, said plurality of cooling holes located in said section.

* * * * *

UNITED STATES PATENT AND TRADEMARK OFFICE
CERTIFICATE OF CORRECTION

PATENT NO. : 4,848,081

DATED : July 18, 1989

INVENTOR(S) : Christopher A. Kennedy

It is certified that error appears in the above-identified patent and that said Letters Patent is hereby corrected as shown below:

Column 3, line 53: after "shape" insert --.--

Column 3, line 54: there should not be a new paragraph starting here.

Column 3, line 58: after "internal" change "vertical" to "vortical"

Column 5, line 11: after "the" change "vertical" to "vortical"

Signed and Sealed this

Fifth Day of June, 1990

Attest:

HARRY F. MANBECK, JR.

*Attesting Officer*      *Commissioner of Patents and Trademarks*